United States Patent
Nelson et al.

(10) Patent No.: US 7,986,884 B2
(45) Date of Patent: Jul. 26, 2011

(54) OPTICAL NETWORK TEST ACCESS POINT DEVICE

(75) Inventors: Stephen Nelson, Santa Clara, CA (US); Greta L. Light, San Mateo, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 940 days.

(21) Appl. No.: 11/757,276

(22) Filed: Jun. 1, 2007

(65) Prior Publication Data

US 2007/0280591 A1 Dec. 6, 2007

Related U.S. Application Data

(60) Provisional application No. 60/803,775, filed on Jun. 2, 2006, provisional application No. 60/803,776, filed on Jun. 2, 2006.

(51) Int. Cl.
H04B 10/00 (2006.01)
(52) U.S. Cl. .......... 398/138; 398/135; 398/164
(58) Field of Classification Search ........ 398/164, 398/165, 166, 202, 207, 212, 79, 82, 43, 398/66, 69, 135, 138, 139
See application file for complete search history.

(56) References Cited

U.S. PATENT DOCUMENTS

| 7,013,088 | B1 | 3/2006 | Jiang et al. |
| 7,088,885 | B1 * | 8/2006 | Wang ............... 385/24 |
| 7,164,863 | B2 * | 1/2007 | Lange et al. ........ 398/79 |
| RE40,564 | E * | 11/2008 | Fischer et al. ..... 455/561 |
| 2006/0067690 | A1 * | 3/2006 | Tatum et al. ....... 398/66 |
| 2006/0093373 | A1 * | 5/2006 | Hahin et al. ....... 398/136 |
| 2007/0280606 | A1 | 12/2007 | Nelson et al. |

OTHER PUBLICATIONS

United States Patent & Trademark Office, Examiner's Office Action mailed Apr. 3, 2009, U.S. Appl. No. 11/757,285.
Applicants' Amendment and Response to Apr. 3, 2009 Office Action, filed Jul. 2, 2009, U.S. Appl. No. 11/757,285.
United States Patent & Trademark Office, Notice of Allowance mailed Jul. 22, 2010, U.S. Appl. No. 11/757,285.

* cited by examiner

*Primary Examiner* — M. R. Sedighian
(74) *Attorney, Agent, or Firm* — Volentine & Whitt, PLLC

(57) ABSTRACT

An optical network test access point ("TAP") device. In one example embodiment, an optical network TAP device includes a printed circuit board and a plurality of optical receiver modules. The printed circuit board includes a microprocessor, a multiplexer connected to the microprocessor, and a plurality of post amplifiers connected to the multiplexer. Each optical receiver module includes one or more ROSAs. Each ROSA is connected to the multiplexer through one of the plurality of post amplifiers.

11 Claims, 3 Drawing Sheets

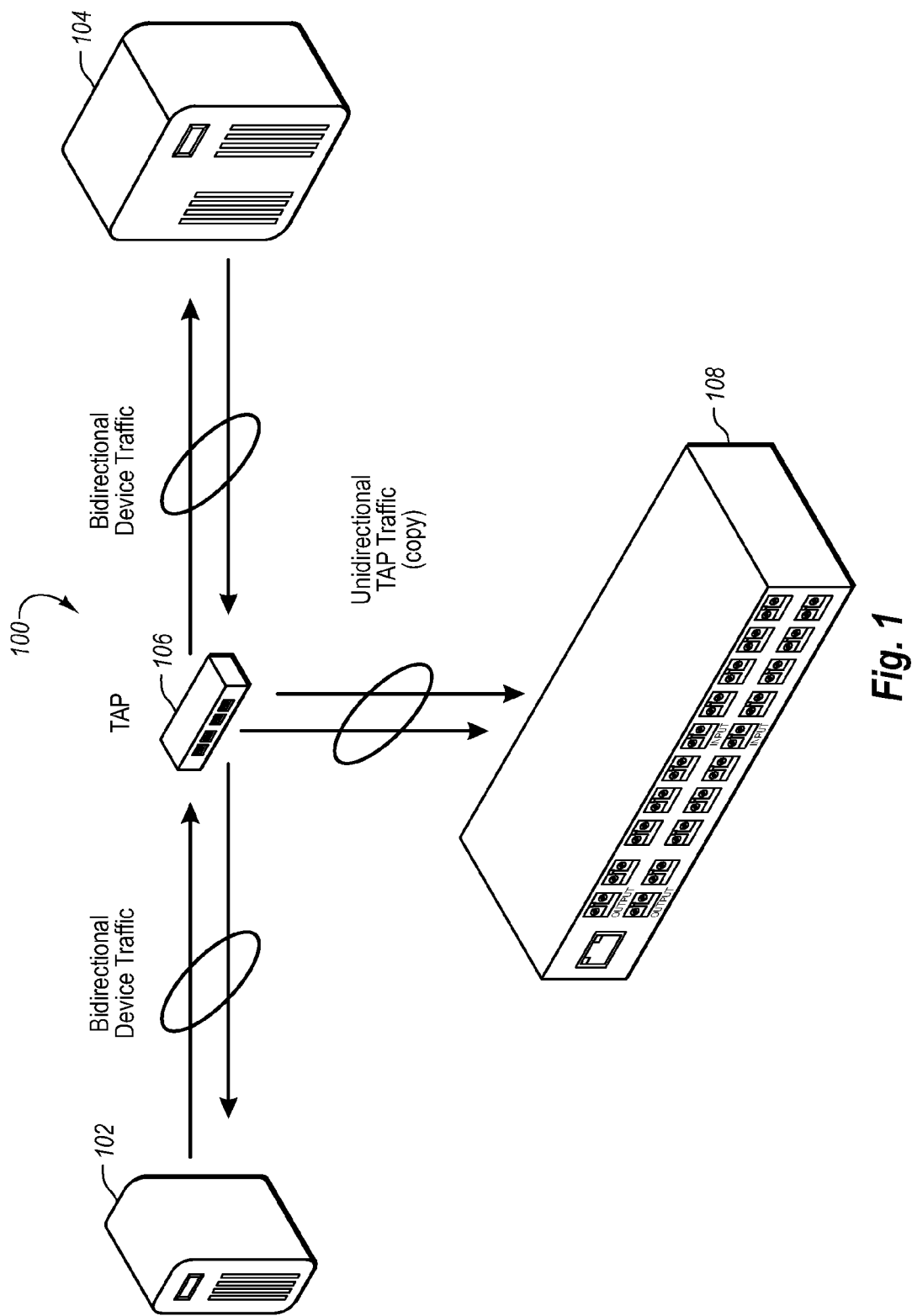

OPTICAL NETWORK TEST ACCESS POINT DEVICE

CROSS-REFERENCE TO A RELATED APPLICATION

This application claims priority to U.S. Provisional Patent Application Ser. No. 60/803,775, filed on Jun. 2, 2006, which is incorporated herein by reference in its entirety. This application also claims priority to U.S. Provisional Patent Application Ser. No. 60/803,776, filed on Jun. 2, 2006, which is also incorporated herein by reference in its entirety.

BACKGROUND

1. The Field of the Invention

The present invention generally relates to systems and devices for use in monitoring and analyzing a data communication network. More particularly, embodiments of the invention relate to a test access point ("TAP") device.

2. Related Technology

The dependence upon the use of data networks to transmit and receive data at high data rates has led to a corresponding interest in the ability to perform real-time monitoring and analysis of that data, or network traffic, so that performance of the network can be evaluated, and problems identified and resolved. Such data monitoring and analysis necessitates the ability to access the network data stream without disrupting data transmission and the operation of the network.

To this end, network test access point ("TAP") devices have been developed. In general, a TAP device is a device that includes various connections by way of which a user can gain access to a network data stream for the purpose of performing monitoring and testing evolutions. Other devices can interface with the TAP device so as to monitor connections or the network traffic of the network in which the TAP device is employed.

One drawback with typical TAP devices relates to the transceivers and ports by way of which the TAP devices receive and send optical data. In particular, each transceiver of a conventional TAP device includes two ports. One of the ports has an optical receiver and the other port has an optical transmitter. Unfortunately, the ability to effectively monitor or analyze a network often requires more receivers than transmitters. The ability to effectively monitor a particular system may require, for example, four times as many receivers as transmitters.

Because each optical receiver is associated with an optical transmitter, some of the optical transmitters are not utilized. For example, only the receiver side of a transceiver may be used where a port is input-only, and the transmitter side of the transceiver will necessarily be idle. Similarly, where a transceiver is connected to an output port of a TAP device, only the transmitter side of that transceiver will be utilized since the port is output-only, and the receiver side of that transceiver will necessarily be idle. Consequently, the purchaser of such TAP devices is compelled to pay for unused components and unused functionality.

Another significant problem with typical TAP devices is redundancy of components resulting in increased cost. A TAP device typically includes a host printed circuit board with a microprocessor. Each transceiver also includes a printed circuit board on which is mounted laser drivers, post amplifiers, and microcontrollers, for example. Cumulatively, a TAP device, besides a potentially unused receiver or transmitter, also includes a redundant printed circuit board and a redundant microcontroller, both of which add cost and complexity to the assembled TAP device.

In view of the foregoing, it is clear that a need exists for devices and systems that address the aforementioned, and other, problems in the art.

BRIEF SUMMARY OF SOME EXAMPLE EMBODIMENTS

In general, example embodiments of the invention relate to systems and devices for use in non-intrusive monitoring and analysis of a data communication network. More particularly, embodiments of the invention are concerned with an optical network test access point ("TAP") device.

In one example embodiment, an optical network TAP device includes a printed circuit board and a plurality of optical receiver modules. The printed circuit board includes a microprocessor, a multiplexer connected to the microprocessor, and a plurality of post amplifiers connected to the multiplexer. Each optical receiver module includes one or more ROSAs. Each ROSA is connected to the multiplexer through one of the plurality of post amplifiers.

In another example embodiment, an optical network TAP device includes an optical receiver module including two ROSAs, an optical transmitter module including two TOSAs, and a printed circuit board. The printed circuit board includes a microprocessor, two post amplifiers, two laser drivers, and a multiplexer. Each post amplifier is connected to one of the ROSAs and each laser driver is connected to one of the TOSAs. Also, the multiplexer is connected to each of the post amplifiers, each of the laser drivers, and the microprocessor.

In yet another example embodiment, an optical network TAP device includes a transceiver module including a ROSA and a TOSA, an optical receiver module including two ROSAs, and a printed circuit board. The printed circuit board includes a microprocessor, at least two post amplifiers, and a multiplexer. Each post amplifier is connected to one of the ROSAs. The multiplexer is connected to each of the post amplifiers and to the microprocessor. The multiplexer is configured to receive a switching command from the microprocessor. The switching command specifies the connection of a particular ROSA to the TOSA or, the disconnection of a particular ROSA from the TOSA.

These and other aspects of example embodiments of the present invention will become more fully apparent from the following description and appended claims.

BRIEF DESCRIPTION OF THE DRAWINGS

To further clarify the above and other aspects of example embodiments of the present invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention nor are they necessarily drawn to scale. Example embodiments of the invention will be disclosed and explained with additional specificity and detail through the use of the accompanying drawings in which:

FIG. 1 is a schematic representation of an example operating environment where one or more optical network TAP devices may be employed;

DETAILED DESCRIPTION OF SOME EXAMPLE EMBODIMENTS

Figure 2A:
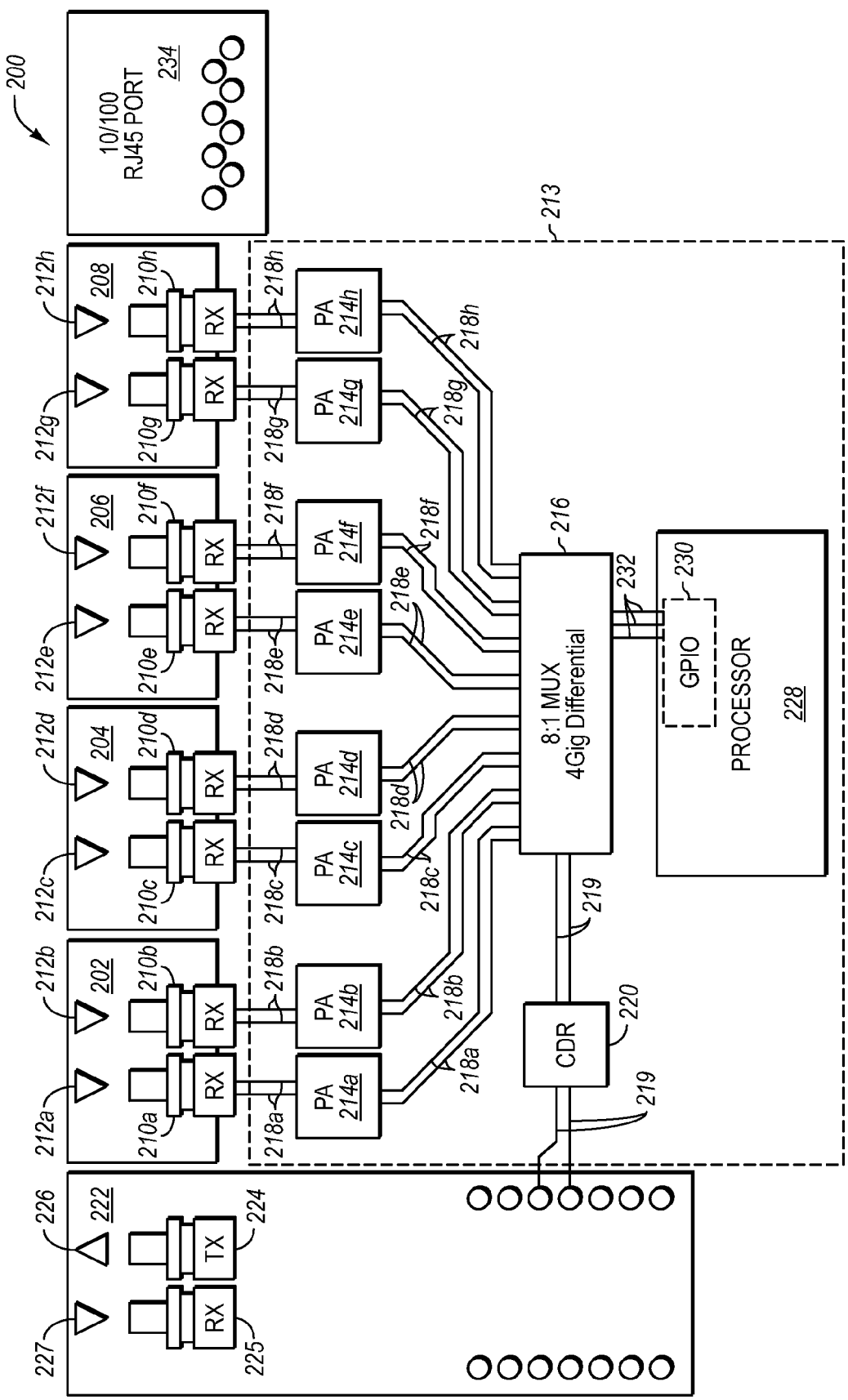
FIG. 2A is a block diagram which illustrates some aspects of an example optical network TAP device.

Embodiments of the invention relate to systems and devices for use in monitoring and analyzing a data communication network. More particularly, embodiments of the invention are concerned with an example optical network test access point ("TAP") device. Example embodiments of the TAP devices can provide multiple full duplex network data signals to analyzers and other devices. In at least some embodiments, the TAP device is a portable device.

1. Example Operating Environments

Embodiments of the invention are well suited for use in connection with the monitoring and analysis of Storage Area Networks ("SANs"). However, the scope of the invention is not so limited and embodiments of the invention can be employed in connection with any other network or system where the functionality disclosed herein may prove useful.

Additionally, embodiments of the invention are compatible for use with various types of software, analyzers, and other devices. For example, some embodiments of the TAP devices are compatible with protocol analyzers (including the hardware and/or software). More generally however, embodiments of the invention can be configured and/or programmed to be used, and interface, with any of a variety of other software and devices, and the scope of the invention should not be construed to be limited to the examples disclosed herein.

Directing attention now to FIG. 1, details are provided concerning some aspects of one example of an operating environment in which one or more TAP devices may be employed. In the illustrated example, the operating environment comprises a communication network, such as the optical communication network 100, that includes various devices, such as a server 102 and storage device 104 for example, between which data is communicated. In general, communication between the communication network 100 devices proceeds in a bidirectional fashion.

In this example, a test access point ("TAP") device 106 is positioned at a desired location in the data stream. As disclosed in FIG. 1, one function of TAP device 106 is to access the data stream and output a unidirectional copy of that data stream. The data stream copy provided by the TAP device 106 can then be used for monitoring and analysis processes, among other things.

For example, a high port density optical network access switch ("ONAS") 108, also known as a "rover," that is compatible with multiple protocols and data rates, can be arranged to receive the output of the TAP device 106. In general, the ONAS 108 receives this output and then directs that data stream to a monitor, analyzer and/or other devices by way of one or more outputs on the ONAS 108. A more detailed discussion of the details of ONAS 108 can be found in copending U.S. patent application Ser. No. 11/290,496, filed Nov. 30, 2005, and entitled "High Density Optical Network Access Switch," which is hereby incorporated by reference in its entirety.

2. Example Optical Network TAP Device

The example TAP device 106 as illustrated in FIG. 1 eliminates unused and/or redundant components found in typical TAP devices in order to decrease the cost and complexity of the TAP device 106.

FIG. 2A is a block diagram which illustrates some aspects of an example TAP device 200 is capable of providing more receivers than transmitters or vice versa. Depending on the configuration of receivers and transmitters, the TAP device 200 can receive data from multiple devices and/or transmit data to multiple devices. FIG. 2A also illustrates high-speed interconnects and control of channel selection in the TAP device 200. The TAP device 200 includes multiple optical receiver modules 202-208. The optical receiver modules 202-208 can conform with any desired form factor. In one embodiment, one or more of the optical receiver modules 202-208 substantially conform with the SFF, SFP, or XFP form factors. However, the scope of the invention is not limited to receiver modules conforming with any particular form factor.

The optical receiver modules 202-208 each include a pair of receive optical subassemblies ("ROSAs") 210a-210b, 210c-210d, 210e-210f, and 210g-210h, respectively. Each of ROSAs 210a-210h includes an optical receiver, such as a photodiode. The input side of each of ROSAs 210a-210h corresponds to an input port 212a-212h, respectively. An example of one such optical receiver module is the optical module 100 disclosed in co-pending U.S. patent application Ser. No. 11/757,285, titled "OPTICAL MODULE FOR A HOST OPTICAL DEVICE," which is filed concurrently herewith and incorporated herein by reference in its entirety.

TAP device 200 also includes a host printed circuit board 213 in which post amplifiers 214a-214h are integrated, each of which corresponds to one of ROSAs 210a-210h. In TAP device 200, the optical receiver modules 202-208 do not include post amplifiers. The post amplifiers 214a-214h are instead integrated into the host printed circuit board 213. In TAP device 200, therefore, a single printed circuit board 213 can include all of the post amplifiers 214a-214h needed by the ROSAs 210a-210h, respectively, instead of including four separate printed circuit boards with post amplifiers in each of the optical receiver modules 202-208. The elimination of these redundant printed circuit boards in the TAP device 200 results in cost savings and decreased complexity.

The TAP device 200 also includes a multiplexer 216. In operation, after optical signals are received and converted into high-speed differential electrical signals by the ROSAs 210a-210h, the electrical signals are sent along high-speed channels 218a-218h to the post amplifiers 214a-214h, respectively. Each of the high-speed channels 218a-218h has two electrical connections (bonded wires, traces, etc.), one of which carries a first electrical signal and one of which carries a second electrical signal. The first and second electrical signals are typically differential signals. The post amplifiers 214a-214h amplify the high-speed differential electrical signals and then send the signals along the high-speed channel 218a-218h to the multiplexer 216. The multiplexer 216 acts as a switch and outputs only one of the high-speed differential electrical signals at a time. Other embodiments of the invention contemplate additional outputs on the multiplexer 216 or multiple multiplexers such that more than one pair of differential signals is output.

The output of multiplexer 216 is sent by way of a high-speed channel 219 to a clock and data recovery ("CDR") module 220. The CDR module 220 functions to overcome any degradation in the signal quality by attempting to clean up the signal quality and amplify the high-speed differential electrical signal. The CDR module 220 also retimes the signals in one embodiment. The CDR module 220 then sends the high-speed differential electrical signal to a transceiver module 222.

The transceiver module 222 can conform with any desired form factor. In one embodiment, the transceiver module 222 substantially conforms with the SFF form factor. However, the scope of the invention is not limited to transceiver modules conforming with any particular form factor. The transceiver module 222 includes both a transmit optical subassembly ("TOSA") 224 as well as a ROSA 225. The TOSA 224 includes an optical transmitter, such as a laser. The ROSA 225 is similar to the ROSAs 210a-210h and corresponds to an optical input port 227. The transceiver module 222 also includes associated circuitry on a printed circuit board (not shown) for operation of the TOSA 224 and ROSA 225, including a laser driver, a post amplifier, and a microprocessor to control the functions of the laser driver and the post amplifier.

In one alternative embodiment, the transceiver module 222 can be implemented using a transceiver module without a printed circuit board, but would instead be connected to host printed circuit board 213 which would include a post amplifier and laser driver corresponding to the TOSA 224 and the ROSA 225, respectively, and controlled by a microprocessor 228. In another embodiment, the transceiver module 222 can be replaced with an optical transmitter module similar to the transmitter module 208B described and illustrated in the copending U.S. patent application Ser. No. 11/290,496, in which case the transceiver module 222 would not include a printed circuit board, but would instead be connected to the host printed circuit board 213 which would include a pair of laser drivers corresponding to the TOSAs of the optical transmitter module and controlled by the microprocessor 228.

As mentioned above, the transceiver module 222 receives high-speed differential electrical signals from the CDR module 220 by way of the high-speed channel 219. The transceiver module 222 then transmits the high-speed differential electrical signals through the TOSA 224, where they are converted into optical signals and subsequently output at an optical output port 226. The optical signal can then be sent to a device configured to analyze the signal, such as the ONAS 108 described above.

The TAP device 200 also includes the microprocessor 228. The microprocessor 228 includes a general purpose input/output ("GPIO") module 230. The GPIO module 230 sends control signals along a low-speed channel 232 to the multiplexer 216. These control signals direct the multiplexer 216 as to which of the high-speed differential electrical signals received on the high-speed channels 218a-218h to send to the CDR 220.

The TAP device 200 also includes an 10/100 Ethernet RJ45 port 234. The port 234 provides the interface for a user to direct the functions of the microprocessor 228, as discussed below in connection with FIG. 2B. The port 234 may also comply with other protocols and/or form factors.

The TAP device 200 can achieve cost savings over a typical TAP device architecture. By moving the post amplifiers 214a-214h out of the optical receiver modules 202-208 and onto a single host printed circuit board 213, the need for a separate printed circuit board and microprocessor to support post amplifiers in each of the optical receiver modules 202-208 is eliminated. This results in a decrease in the overall cost and complexity of the TAP device into which the optical receiver modules 202-208 are assembled. The TAP device 200 also eliminates the cost of other electrical connectors that run between the ROSAs 210a-210h and the respective printed circuit boards included in typical transceivers. The elimination of these electrical connectors results in better signal quality because the electrical connection between a typical transceiver printed circuit board and a host printed circuit board can cause discontinuity and degrade the performance of the high-speed differential electrical signals.

Since the optical receiver modules 202-208 can have a form factor similar to that of a standard transceiver module, the optical receiver modules 202-208, which each include more than one optical receiver in this example, can easily be integrated into TAP devices that are designed for standard transceiver modules. Where a TAP device currently does not use the transmitter component of a certain transceiver, replacing the transceiver with an optical receiver module can save overall cost and complexity of the optical device because the unnecessary transmitter is eliminated and replaced with a receiver that can be used by the TAP device.

Figure 2B:
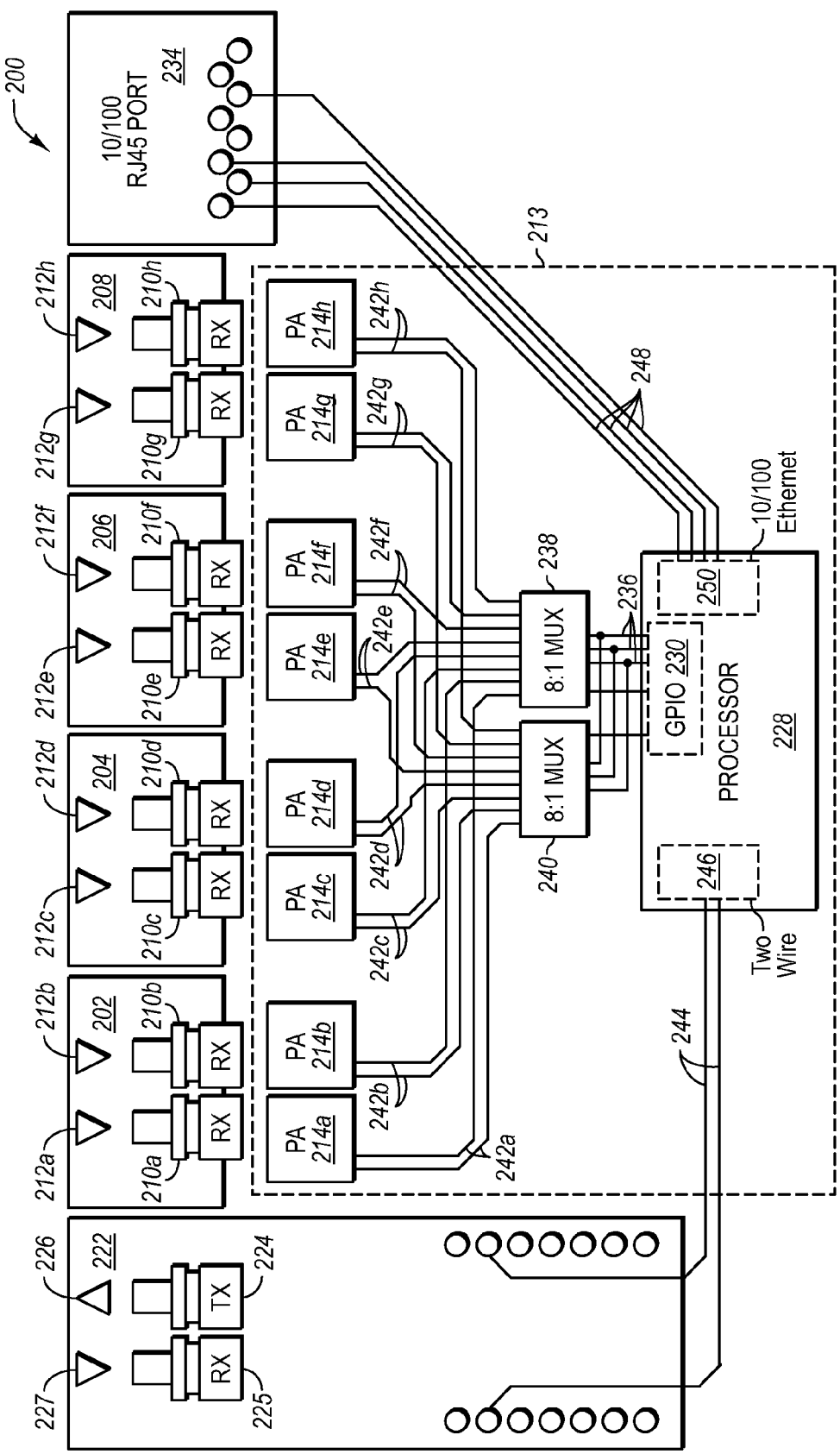
FIG. 2B is a block diagram which illustrates other aspects of an example optical network TAP device.

FIG. 2B is a block diagram which illustrates some other aspects of the example TAP device 200. FIG. 2B illustrates, for example, how a single microprocessor can control multiple high-speed channels in the TAP device 200. As discussed above in connection with FIG. 2A, the TAP device 200 includes the single microprocessor 228 which functions to direct the multiplexer 216 as to which high-speed differential electrical signal received on the high-speed channels 218a-218h should be sent on to the CDR module 220. As shown in FIG. 2B, the microprocessor 228 also functions to control the function of the post-amplifiers 214a-214h using low-speed control signals. In particular, low-speed control signals are sent along low-speed channels 236 by the GPIO module 230 of the microprocessor 228 to a pair of multiplexers 238 and 240. The GPIO module 230 instructs the multiplexers 238 and 240 as to which of the post amplifiers 214a-214h to establish electronic communication with at any given time. The multiplexers 238 and 240 then switch between the low-speed control channels 242a-242h according to the control signal(s) received on the low-speed control channels 236.

The low-speed control channels 242a-242h may be, in one embodiment, two-wire interfaces that require a clock wire and a data wire in order to control each of the post amplifier 214a-214h. In one example embodiment, the wires of the control channels 242a-242h that are connected to the multiplexer 238 are data wires and the wires of control channels 242a-242h that are connected to the multiplexer 240 are clock wires.

The TAP device 200 also includes a low-speed control channel 244 through which a two-wire interface 246 of the microprocessor 228 sends control signals to the transceiver module 222. These control signals are used to control the functionality of the transceiver module 222. The low-speed control channel 244 is also used to transmit messages between the two-wire interface 246 and the transceiver module 222. The TAP device 200 also includes control channels 248 through which an Ethernet module 250 of microprocessor 228 sends control signals to the port 234.

The ability of the single microprocessor 228 to control the multiple post amplifiers 214a-214h in the TAP device 200 enables the TAP device 200 to achieve cost savings over a typical TAP device. By moving the post amplifiers 214a-214h out of optical receiver modules 202-208 and onto the single printed circuit board 213, and by controlling the post amplifiers 214a-214h using a single microprocessor 228, the need for multiple printed circuit board to support post amplifiers and microprocessors in each of optical receiver modules 202-208 is eliminated. In the example TAP device 200, this results in the elimination of redundant microprocessors. In other TAP devices that use additional optical receivers, this will result in the elimination of additional microprocessors. This results in a decrease in the overall cost and complexity of these TAP devices.

It should be noted that some the components illustrated in FIGS. 2A and 2B could be integrated into single components which include the functionality of the separate components illustrated in these figures. Likewise, various alternative configurations of high-speed data channels and low-speed control channels could be used in place of the configurations illustrated in FIGS. 2A and 2B. Therefore, alterative TAP devices can be designed to include necessary components and eliminate unnecessary components. In particular, alterative TAP devices can be designed to eliminate unused or redundant components found in typical transceivers in order to decrease the overall cost and complexity of the TAP devices.

Further, the example TAP device 200 illustrated in FIGS. 2A and 2B has the advantage of providing flexibility when a component fails or is upgraded, for example. If a particular ROSA fails, for example, the module in which the ROSA is positioned could be replaced with a similar module. In this case, however, the corresponding post amplifier and processor are not replaced, thus reducing the cost of remedying a failed ROSA.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An optical network TAP device comprising:
   a host printed circuit board;
   an optical receiver module comprising two ROSAs that are not integrated into the host printed circuit board;
   an optical transmitter module comprising two TOSAs that are not integrated into the host printed circuit board;
   a microprocessor integrated into the host printed circuit board;
   two post amplifiers integrated into the host printed circuit board, each post amplifier being connected to one of the ROSAs;
   two laser drivers integrated into the host printed circuit board, each laser driver being connected to one of the TOSAs; and
   a first multiplexer integrated into the host printed circuit board and connected to each of the post amplifiers, to each of the laser drivers, and to the microprocessor.

2. The optical network TAP device as recited in claim 1, wherein the host printed circuit board further comprises at least one clock and data recovery module positioned along at least one high-speed channel connecting at least one of the TOSAs to the first multiplexer.

3. The optical network TAP device as recited in claim 1, wherein the host printed circuit board further comprises:
   a second multiplexer connected to the microprocessor; and
   a third multiplexer connected to the microprocessor,
   wherein each post amplifier is connected to the second multiplexer and to the third multiplexer.

4. The optical network TAP device as recited in claim 1, further comprising an Ethernet port connected to the microprocessor, wherein the microprocessor is configured to receive control signals through the Ethernet port.

5. The optical network TAP device as recited in claim 1, wherein the at least one optical receiver module and the at least one optical transmitter module substantially comply with at least one of an SFF form factor, an SFP form factor, or an XFP form factor.

6. An optical network TAP device, comprising:
   a host printed circuit board;
   a transceiver module comprising a ROSA and a TOSA that are not integrated into the host printed circuit board;
   an optical receiver module comprising two ROSAs that are not integrated into the host printed circuit board;
   a microprocessor integrated into the host printed circuit board;
   at least two post amplifiers integrated into the host printed circuit board, each post amplifier connected to one of the ROSAs; and
   a first multiplexer integrated into the host printed circuit board and connected to each of the post amplifiers and to the microprocessor, the first multiplexer being configured to receive a switching command from the microprocessor, where the switching command specifies at least one of: connection of a particular ROSA to the TOSA; or, disconnection of a particular ROSA from the TOSA.

7. The optical network TAP device as recited in claim 6, wherein:
   the ROSAs of the optical receiver module are each connected to one of the post amplifiers via at least one high-speed channel;
   each post amplifier is connected to the first multiplexer via at least one high-speed channel;
   the TOSA is connected to the first multiplexer via at least one high-speed channel; and
   the microprocessor is connected to the first multiplexer via at least one low-speed channel.

8. The optical network TAP device as recited in claim 7, wherein the host printed circuit board further comprises at least one additional multiplexer connected to each post amplifier and to the microprocessor via at least one low-speed channel.

9. The optical network TAP device as recited in claim 6, wherein the host printed circuit board further comprises at least one clock and data recovery module positioned along at least one high-speed channels connecting the TOSA to the first multiplexer.

10. The optical network TAP device as recited in claim 6, further comprising an Ethernet port connected to the microprocessor, wherein the microprocessor is configured to receive control signals through the Ethernet port.

11. The optical network TAP device as recited in claim 6, wherein the optical receiver module and the transceiver module substantially comply with the SFF form factor.

* * * * *